United States Patent
Cheng et al.

(10) Patent No.: US 10,367,632 B2
(45) Date of Patent: Jul. 30, 2019

(54) CONTROL SIGNALING FOR FLEXIBLE DUPLEX IN WIRELESS COMMUNICATIONS

(71) Applicants: Peng Cheng, Beijing (CN); Yin Huang, Beijing (CN); Neng Wang, Beijing (CN); Chao Wei, Beijing (CN); QUALCOMM Incorporated, San Diego, CA (US)

(72) Inventors: Peng Cheng, Beijing (CN); Yin Huang, Beijing (CN); Neng Wang, Beijing (CN); Chao Wei, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 49 days.

(21) Appl. No.: 15/546,219

(22) PCT Filed: Mar. 4, 2016

(86) PCT No.: PCT/CN2016/075598
§ 371 (c)(1),
(2) Date: Jul. 25, 2017

(87) PCT Pub. No.: WO2016/138872
PCT Pub. Date: Sep. 9, 2016

(65) Prior Publication Data
US 2018/0019859 A1 Jan. 18, 2018

(30) Foreign Application Priority Data
Mar. 5, 2015 (CN) .............. PCT/CN2015/073691

(51) Int. Cl.
*H04W 72/04* (2009.01)
*H04L 5/14* (2006.01)
(Continued)

(52) U.S. Cl.
CPC .......... *H04L 5/1461* (2013.01); *H04B 7/0626* (2013.01); *H04L 1/1671* (2013.01);
(Continued)

(58) Field of Classification Search
CPC ........ H04W 76/04; H04W 72/08; H04L 5/14; H04L 5/00; H04L 5/0055
See application file for complete search history.

(56) References Cited

U.S. PATENT DOCUMENTS 9,119,074 B2    8/2015   Tavildar et al.
2012/0243448 A1*   9/2012   Pan ...................... H04W 48/16
                                                       370/280
(Continued)

FOREIGN PATENT DOCUMENTS

CN          102958173 A     3/2013
EP           1259092 A2     11/2002
(Continued)

OTHER PUBLICATIONS

International Search Report and Written Opinion—PCT/CN2016/075598—ISA/EPO—dated May 26, 2016. 11 pages.
(Continued)

*Primary Examiner* — Chi Ho A Lee
(74) *Attorney, Agent, or Firm* — Arent Fox, LLP

(57) ABSTRACT

Aspects described herein generally relate to communicating between a user equipment (UE) and a cell using frequency division duplexing (FDD) to separate an uplink frequency band and a downlink frequency band with the cell. An indicator can be transmitted from the cell and received by the UE to implement time division duplexing (TDD) on the uplink frequency band. Based at least in part on the indicator, communicating between the UE and the cell can include separating the uplink frequency band into a plurality of downlink subframes for receiving downlink communica-
(Continued)

tions from the cell and a plurality of uplink subframes for transmitting uplink communications to the cell.

20 Claims, 10 Drawing Sheets

(51) Int. Cl.
  *H04W 76/27* (2018.01)
  *H04B 7/06* (2006.01)
  *H04L 1/16* (2006.01)
  *H04L 1/18* (2006.01)
  *H04L 5/00* (2006.01)
  *H04W 72/08* (2009.01)

(52) U.S. Cl.
  CPC .......... *H04L 1/1854* (2013.01); *H04L 5/0053* (2013.01); *H04L 5/1469* (2013.01); *H04W 72/044* (2013.01); *H04W 76/27* (2018.02); *H04L 1/18* (2013.01); *H04L 5/0055* (2013.01); *H04W 72/0446* (2013.01); *H04W 72/08* (2013.01)

(56) References Cited

U.S. PATENT DOCUMENTS

| | | | | |
|---|---|---|---|---|
| 2013/0242902 A1* | 9/2013 | Liu | ....................... | H04W 24/10 370/329 |
| 2014/0003303 A1* | 1/2014 | Yang | ..................... | H04L 1/1867 370/280 |
| 2015/0229463 A1* | 8/2015 | Oh | ....................... | H04B 1/0057 370/278 |
| 2015/0271837 A1* | 9/2015 | Larsson | ................ | H04L 1/1861 370/329 |
| 2015/0334682 A1* | 11/2015 | Yin | ........................ | H04W 72/12 370/329 |
| 2015/0358994 A1* | 12/2015 | Guo | ....................... | H04L 1/1861 370/280 |
| 2016/0013896 A1* | 1/2016 | Sun | ........................ | H04L 1/1854 370/280 |
| 2016/0211950 A1* | 7/2016 | Cheng | ................... | H04L 1/1864 |
| 2016/0227519 A1 | 8/2016 | Nimbalker et al. | | |
| 2016/0352495 A1* | 12/2016 | Wada | ..................... | H04B 1/406 |
| 2017/0064648 A1* | 3/2017 | Park | .................... | H04W 52/146 |

FOREIGN PATENT DOCUMENTS

| | | |
|---|---|---|
| WO | 2012109195 A2 | 8/2012 |
| WO | WO-2013/184819 A1 | 12/2013 |
| WO | WO-2014/178852 A1 | 11/2014 |

OTHER PUBLICATIONS

International Search Report and Written Opinion—PCT/CN2015/073691—ISA/EPO—dated Dec. 4, 2015.
Povey G.J.R., et al., "A review of Time Division Duplex-CDMA Techniques", Spread Spectrum Techniques and Applications, 1998 Proceedings., 1998 IEEE 5th International Symposium on Sun City, South Africa Sep. 2-4, 1998, New York, NY, USA, IEEE, US, vol. 2, Sep. 2, 1998, DOI: 10.1109/ISSSTA.1998.723862, ISBN: 978-0-7803-4281-1, pp. 630-633.
Supplementary European Search Report—EP16758487—Search Authority—The Hague—Sep. 26, 2018.

* cited by examiner

US 10,367,632 B2

CONTROL SIGNALING FOR FLEXIBLE DUPLEX IN WIRELESS COMMUNICATIONS

CLAIM OF PRIORITY

The present Application for Patent is a National Stage entry of PCT Patent Application No. PCT/CN2016/075598 entitled "CONTROL SIGNALING FOR FLEXIBLE DUPLEX IN WIRELESS COMMUNICATIONS" Filed Mar. 4, 2016, which claims priority to PCT Patent Application No. PCT/CN2015/073691 entitled "CONTROL SIGNALING FOR FLEXIBLE DUPLEX IN WIRELESS COMMUNICATIONS" Filed Mar. 5, 2015, which are assigned to the assignee hereof and are hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user euipment (UEs), mobile devices or stations (STAs). A base station may communicate with the communication devices on downlink channels (e.g., for transmissions from a base station to a UE) and uplink channels (e.g., for transmissions from a UE to a base station).

As cellular networks have become more congested, operators are beginning to look at ways to maximize the use of available network resources. One approach may include utilizing spare uplink resources (e.g., available spectrum) to schedule downlink traffic from the base station to one or more communication devices. This may, however, impact certain uplink transmissions from the UEs, such as hybrid automatic repeat/request (HARD) transmission feedback, channel state information (CSI) transmissions, etc. For example, it is possible that uplink resources configured for such transmissions are utilized for scheduling downlink traffic by the base station, in which case the uplink transmissions may not be received by the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For example, a method for providing flexible duplexing in wireless communications is provided. The method includes communicating with a cell using frequency division duplexing (FDD) to separate an uplink frequency band and a downlink frequency band with the cell, receiving an indicator from the cell to implement time division duplexing (TDD) on the uplink frequency band, and communicating with the cell using TDD to separate the uplink frequency band into a plurality of downlink subframes for receiving downlink communications from the cell and a plurality of uplink subframes for transmitting uplink communications to the cell based at least in part on receiving the indicator.

In another example, an apparatus for providing flexible duplexing in wireless communications is provided. The apparatus includes a communicating component configured to communicate with a cell using FDD to separate an uplink frequency band and a downlink frequency band with the cell, and a indicator receiving component configured to receive an indicator from the cell to implement TDD on the uplink frequency band, wherein the communicating component is further configured to communicate with the cell using TDD to separate the uplink frequency band into a plurality of downlink subframes for receiving downlink communications from the cell and a plurality of uplink subframes for transmitting uplink communications to the cell based at least in part on receiving the indicator.

In yet another example, an apparatus for providing flexible duplexing in wireless communications is provided. The apparatus includes means for communicating with a cell using FDD to separate an uplink frequency band and a downlink frequency band with the cell, means for receiving an indicator from the cell to implement TDD on the uplink frequency band, and means for communicating with the cell using TDD to separate the uplink frequency band into a plurality of downlink subframes for receiving downlink communications from the cell and a plurality of uplink subframes for transmitting uplink communications to the cell based at least in part on receiving the indicator.

In a further example, a computer-readable medium storing code for providing flexible duplexing in wireless communications is provided. The code includes code for communicating with a cell using FDD to separate an uplink frequency band and a downlink frequency band with the cell, code for receiving an indicator from the cell to implement TDD on the uplink frequency band, and code for communicating with the cell using TDD to separate the uplink frequency band into a plurality of downlink subframes for receiving downlink communications from the cell and a plurality of uplink subframes for transmitting uplink communications to the cell based at least in part on receiving the indicator In another specific example, a method for providing flexible duplexing in wireless communications includes communicating with a UE using FDD to separate an uplink frequency band and a downlink frequency band with the UE, transmitting an indicator to the UE to implement TDD on the uplink frequency band, and communicating with the UE using TDD to separate the uplink frequency band into a plurality of downlink subframes for transmitting downlink communications to the UE and a plurality of uplink subframes for receiving uplink communications from the UE based at least in part on transmitting the indicator. The method can also include wherein transmitting the indicator comprises transmitting the indicator to the UE in at least one of a bit indicator in a physical layer control channel, a media access channel (MAC) control element (CE) of a signal, or in a radio resource control (RRC) signal transmitted over the downlink frequency band. Further, the method can include transmitting a reference TDD configuration to the UE indicating at least one of the plurality of uplink subframes for transmitting an acknowledgement (ACK)/negative-ACK (NACK) in the uplink frequency band. The method can also include wherein transmitting the reference TDD configuration comprises transmitting the reference TDD configuration to the UE via system information block (SIB) or via RRC signaling. Moreover, the method may include scheduling control data resources for the UE over an uplink frequency portion of at least one of the plurality of downlink subframes. The method may also include wherein the uplink frequency portion of at least one of the plurality of downlink subframes is separated from a downlink frequency portion by a guard band. Also, the method may include transmitting one or more parameters related to the guard band to the UE. The method may also include transmitting a configuration to the UE indicating at least one of the plurality of uplink subframes for transmitting channel state information (CSI) feedback. In addition, the method may include rejecting connection requests from one or more UEs based at least in part on determining that the one or more UEs do not support flexible duplexing. The method may also include transmitting a configuration of a switch guard period in one or more of the plurality of downlink subframes to the UE for switching between communicating using the plurality of downlink subframes and the plurality of uplink subframes. In addition, the method may include scheduling control data communications for the UE in a portion of one or more of the plurality of downlink subframes that does not correspond to a switch guard period.

In another specific example, an apparatus for providing flexible duplexing in wireless communications includes a communicating component configured to communicate with a UE using FDD to separate an uplink frequency band and a downlink frequency band with the UE, and an indicator transmitting component configured to transmit an indicator to the UE to implement TDD on the uplink frequency band, wherein the communicating component is further configured to communicate with the UE using TDD to separate the uplink frequency band into a plurality of downlink subframes for transmitting downlink communications to the UE and a plurality of uplink subframes for receiving uplink communications from the UE based at least in part on transmitting the indicator. The apparatus can be configured to perform additional aspects described in the above method.

In another example, an apparatus for providing flexible duplexing in wireless communications includes means for communicating with a UE using FDD to separate an uplink frequency band and a downlink frequency band with the UE, means for transmitting an indicator to the UE to implement TDD on the uplink frequency band, and means for communicating with the UE using TDD to separate the uplink frequency band into a plurality of downlink subframes for transmitting downlink communications to the UE and a plurality of uplink subframes for receiving uplink communications from the UE based at least in part on transmitting the indicator. The apparatus can include means for performing additional aspects described in the above method.

Still in a further aspect, a computer-readable medium storing code for providing flexible duplexing in wireless communications includes code for communicating with a UE using FDD to separate an uplink frequency band and a downlink frequency band with the UE, code for transmitting an indicator to the UE to implement TDD on the uplink frequency band, and code for communicating with the UE using TDD to separate the uplink frequency band into a plurality of downlink subframes for transmitting downlink communications to the UE and a plurality of uplink subframes for receiving uplink communications from the UE based at least in part on transmitting the indicator. The computer-readable medium can further include code for performing additional aspects described in the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
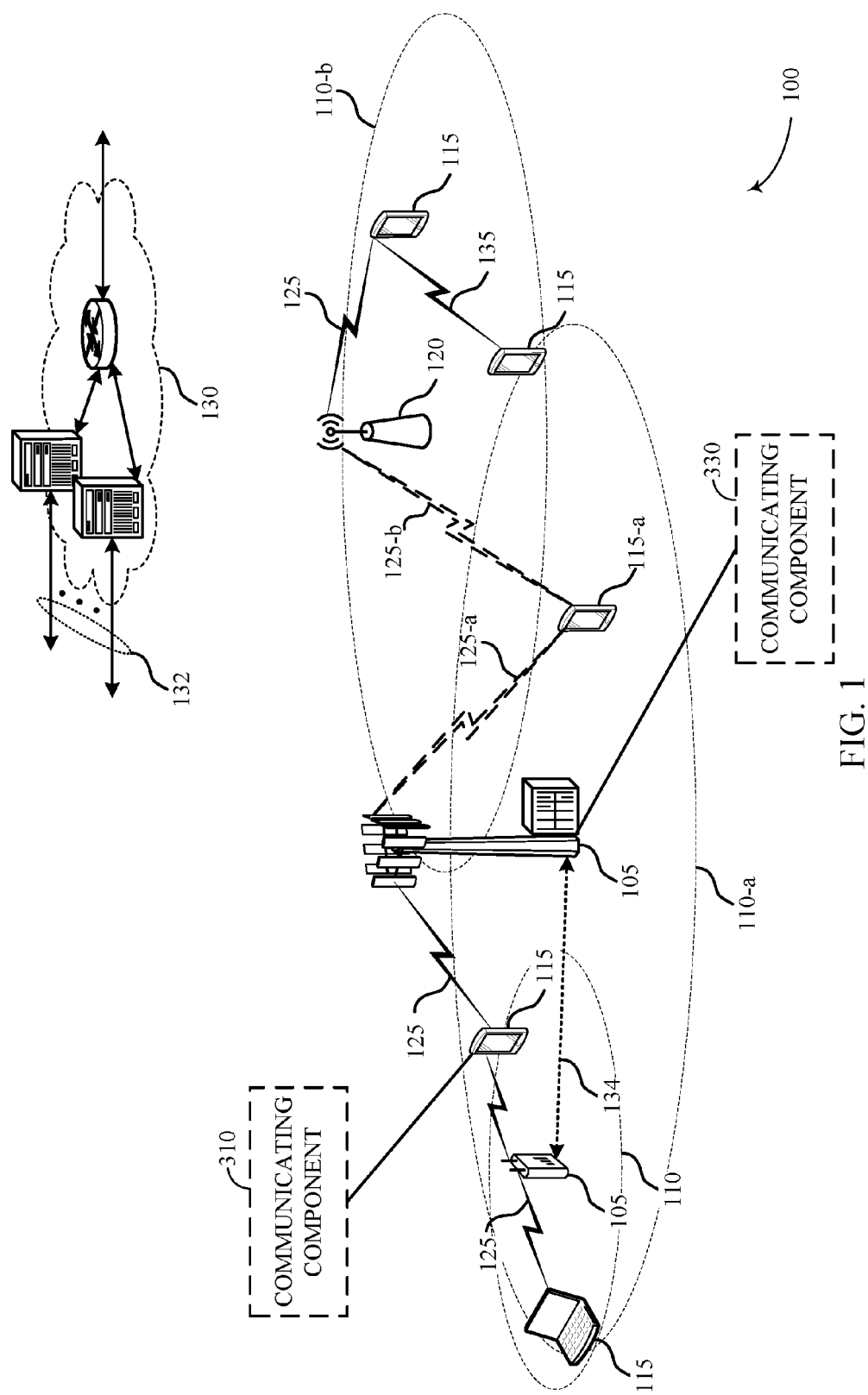
FIG. 1 illustrates an example of a wireless communications system for communicating base stations, access points, mobile terminals, etc. in accordance with various aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, in an aspect, a component may be generally understood to be one of the parts that make up a system, may be hardware or software, and/or may be divided into other components.

Multiple access technologies may use Frequency Division Duplexing (FDD) or Time Division Duplexing (TDD) to provide uplink and downlink communications over one or more carriers. TDD operation may provide relatively flexible deployments without requiring paired spectrum resources. TDD formats (or configurations) include transmission of frames of data, each including a number of different subframes in which different subframes may be uplink or downlink subframes. In systems that operate using TDD, different formats (or configurations) may be used in which uplink and downlink communications may be asymmetric. FDD operation utilizes different frequency bands (also referred to as carriers) for concurrent uplink and downlink communications.

Flexible duplexing can be implemented in FDD to allow, for example, the uplink frequency band to include both uplink and downlink subframes in TDD. This allows for providing more downlink bandwidth at the base station to better match the traffic pattern at the base station. It is to be appreciated, however, that flexible duplexing may also include allowing the downlink frequency band to include both downlink and uplink subframes in TDD (e.g., where more uplink bandwidth is needed at the base station), though it is described more in terms of splitting the uplink frequency band herein. Allocating the uplink frequency band in this regard, however, may impact certain uplink transmissions in certain radio access technologies, such as third generation partnership project (3GPP) long term evolution (LTE).

For example, in LTE-FDD, a user equipment (UE) transmits downlink hybrid automatic repeat/request (HARQ) feedback to a base station in a fixed uplink subframe occurring after the associated downlink transmission (e.g., 4 subframes after the downlink transmission). When flexible duplexing is enabled at the base station, however, it is possible that the uplink subframe during which downlink HARQ feedback is to be transmitted is allocated for downlink communications in TDD, and thus the UE may not be able to transmit (or the base station may not receive) the downlink HARQ communication. Similarly, periodic channel station information (CSI) transmissions at the UE may be similarly impacted by flexible duplexing, especially since flexible duplexing can be dynamically configured to be activated when it is desired to handle an increase in downlink communication demand. For UEs supporting flexible duplexing, HARQ and CSI may be configured based on the flexible duplexing configuration. For UEs that do not support flexible duplexing (also referred to herein as legacy UEs), however, flexible duplexing may be configured such to minimize impact to such UEs and/or the UEs can be steered away from base stations that support flexible duplexing.

In one example, to support legacy UEs, the subframes of the uplink frequency band that are configured for downlink communications can include one or more uplink frequency subbands (e.g., at the edges of the uplink frequency band) that are separated from the downlink frequency subband by a guard band. Accordingly, legacy UEs can transmit HARQ feedback in the uplink subbands regardless of whether the subframes are configured for uplink or downlink communications in flexible duplexing.

Various aspects described herein relate to providing flexible duplexing in wireless communications by allocating a portion of subframes in an uplink frequency band in FDD to uplink and downlink communications using TDD. An indication of providing the flexible duplexing can be provided to user equipment (UE) impacted by the flexible duplexing. In addition, hybrid automatic repeat/request (HARQ) communications, channel state information (CSI) transmissions, etc. can be configured for communicating in the flexible duplexing configuration (e.g., by UEs that support flexible duplexing and/or for UEs that do not support flexible duplexing). Moreover, in an example, UEs that do not support flexible duplexing may be steered away from base stations implementing flexible duplexing to mitigate inoperability of the UEs in communicating with the base stations.

In a specific example, a transmitter usage predicting component is provided at the UE that determines the transmitter activity for the first subscription at the physical layer. The transmitter usage predicting component can accept query input including a TTI length, number of time slots and location, etc. related to the second subscription, and can provide a query output regarding overlap with the first subscription for the TTI length, number of time slots and location, etc. Thus, for example, the transmitter usage predicting component can be used to determine predicted transmitter usage of the first subscription, which may have a higher priority for using the transmitter, and the UE may utilize the predicted transmitter usage of the first subscription in determining scheduling of transmitter usage for the second subscription.

FIG. 1 illustrates an example of a wireless communications system 100 for coordinating interference management in accordance with various aspects described herein. The wireless communications system 100 includes base stations 105, access points (AP) 120, mobile devices 115, and a core network 130. One or more base stations 105 (or APs 120) may include a communicating component 330, as described further herein, for implementing flexible duplexing in communicating with one or more mobile devices 115. Similarly, one or more of the mobile devices 115 may include a communicating component 310, as described further herein, for implementing flexible duplexing in communicating with the one or more base station 105 (or APs 120). The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-a for a base station 105 and coverage area 110-b for AP 120 may be divided into sectors making up only a portion of the coverage area (not shown). The wireless communications system 100 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless links 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the wireless communications system 100.

In some examples, the wireless communications system 100 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 100 may include a heterogeneous LTE/LTE-A network in which different types of eNBs provide coverage for various geographical regions. The wireless communications system 100 may, in some examples, also support a wireless local area network (WLAN). A WLAN may be a network employing techniques based on the Institute of Electrical and Electronics Engineers (IEEE) 802.11 family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). In some aspects of the present disclosure, the base station 105 may be referred to as a macro eNB, and AP 120 may be referred to as small cell base station.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 100, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. The mobile devices 115 may be multi-radio devices employing adaptive scanning techniques. For example, a mobile device 115 may dynamically adapt scanning operations of one of its radios based on a signal quality of another of its radios. In some examples, a dual-radio mobile device 115-a, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 100 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-NII radio band, which may also be referred to as the 5 GHz or 5 G band. By contrast, the term "licensed spectrum" or "cellular spectrum" may be used herein to refer to wireless spectrum utilized by wireless network operators under administrative license from a governing agency.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Data in wireless communications system 100 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

Figure 2:
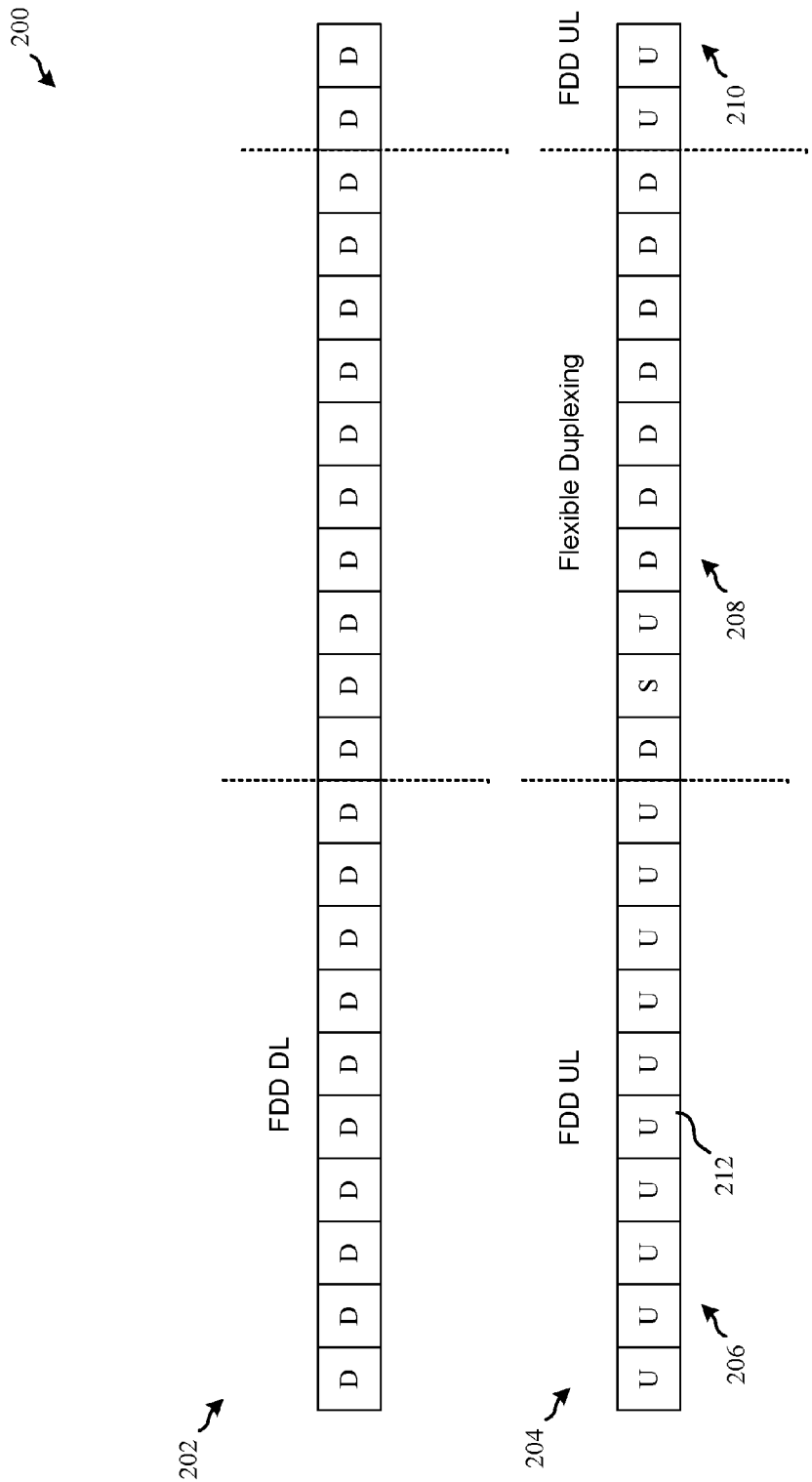
FIG. 2 illustrates an example frequency division duplexing (FDD) configuration in accordance with various aspects described herein.

FIG. 2 illustrates an example FDD configuration 200 for communicating between nodes of a wireless network. For example, the FDD configuration can include an FDD downlink (DL) 202 and an FDD uplink (UL) 204. The FDD DL 202 and FDD UL 204 can be separated in frequency to include a downlink frequency band and an uplink frequency band, which may be contiguous or non-contiguous bands in the frequency spectrum. In LTE, for example, a base station can allocate the FDD DL 202 and FDD UL 204 frequency resources to one or more UEs communicating therewith, where the FDD DL 202 facilitates communicating from the base station to the UE, and the FDD UL 204 facilitates scheduling communications from the UE to the base station. Typically, the FDD DL 202 comprises a plurality of subframes each configured for downlink communications, and the FDD UL 204 comprises a plurality of subframes each configured for uplink communications. A frame 206 of the FDD UL 204 is shown to include a plurality of subframes configured for uplink communications. For example, the FDD DL 202 and FDD UL 204 can be substantially aligned in time, and each 'D' or 'U' block can represent a subframe, where 10 subframes can form a frame. In a specific example, in LTE, each subframe can be 1 ms in length such that a frame can be 10 ms in length.

In flexible duplexing, the uplink frequency band in FDD UL 204 can be allocated to include one or more downlink subframes to provide additional downlink resources at a base station (e.g., where downlink traffic demand increases). Thus, for a given frame 208, in one example, the FDD UL 204 is configured to include one or more downlink subframes, denoted 'D,' and one or more uplink subframes, denoted 'U,' configured in TDD in frame 208. It is to be appreciated that one or more special subframes, denoted 'S,' can be configured in the frame as well for switching from downlink communications to uplink communications. In a subsequent frame, such as frame 210, FDD UL 204 can be configured to have one or more frames that are configured for uplink communications in each subframe (e.g., where downlink traffic demand decreases). In one specific example, an event may occur around downlink subframe 212 that causes the base station to determine to switch to flexible duplexing in the next frame. For example, a large amount of downlink packets may arrive at subframe 212, or a buffer at the base station that stores downlink packets for transmission may be determined to reach a threshold level, etc.

Flexible duplexing allows for considering utilization of spare uplink resources for downlink transmission in consideration of tremendous downlink traffic demand and limited available frequency spectrum. For example, traffic between downlink and uplink may be around 4:1, and with increased portions of video data for mobile traffic, the ratio may significantly increase. Flexible duplexing, as described above, is able to support flexibility of dynamic traffic adapted resource allocation. For example, a given base station may work as FDD by default, but may be able to reconfigure the uplink to use TDD to offload some downlink traffic, as described above. Using flexible duplexing, however, may result in utilizing some specific control signaling, such as control signaling to indicate reconfiguration to use flexible duplexing, control signaling to indicate downlink HARQ format, control signaling to indicate CSI feedback (e.g., support two CSI processes for FDD UL transmission and offloading DL transmission, respectively), control signaling for backward compatibility with legacy UEs that may lose an ACK/NACK resource when using flexible duplexing, control signaling to indicate a guard period for switching from DL to UL, etc.

Referring to FIGS. 3-7, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 4-7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 3:
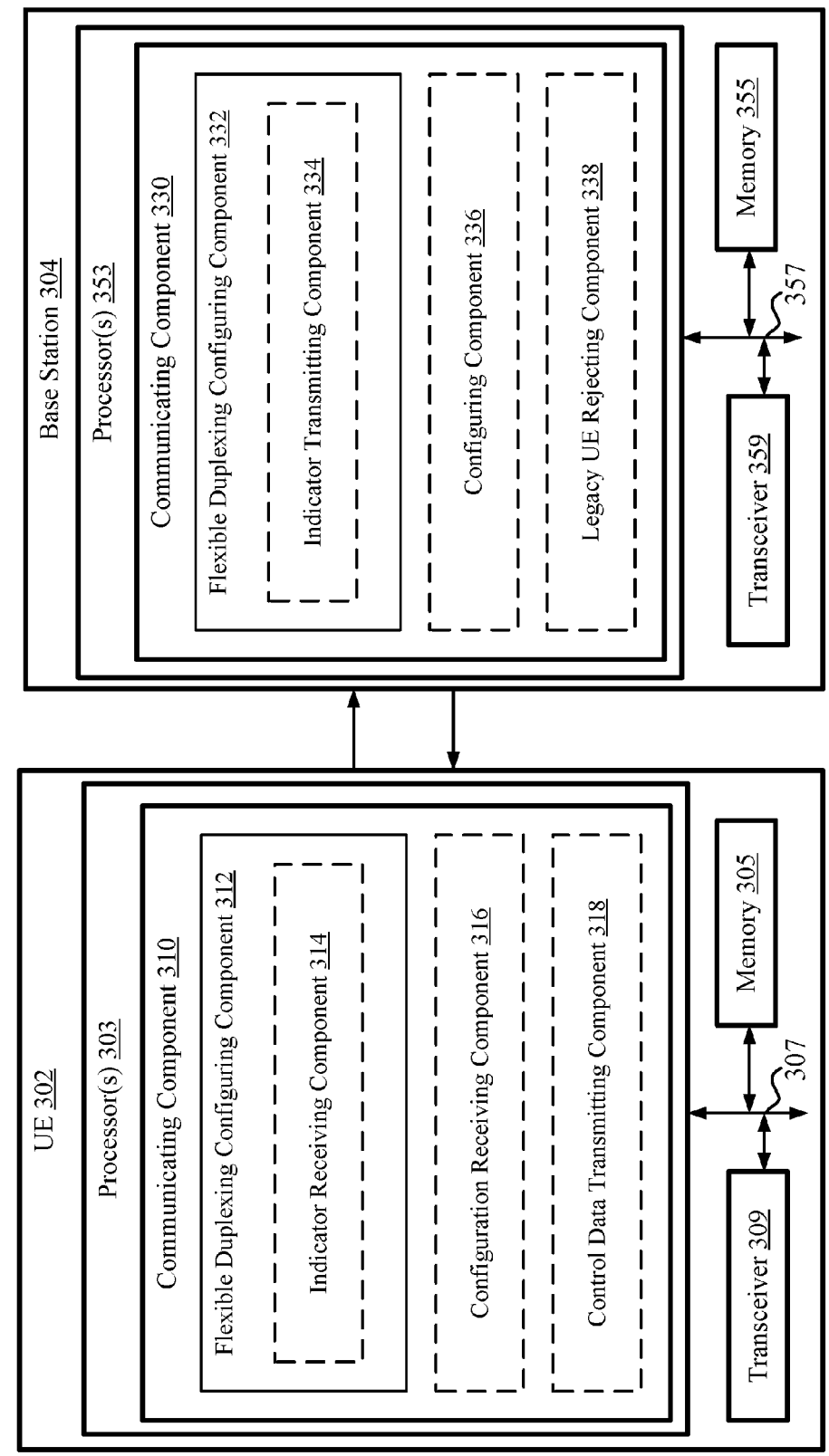
FIG. 3 illustrates an example of a wireless communications system for implementing flexible duplexing in accordance with various aspects described herein.

Referring now to FIG. 3, in an aspect, a wireless communication system 300 includes at least one UE 302 in communicating with a base station 304. In some examples, the UE 302 may be an example of mobile device 115, and/or the base station 304 may be a base station 105, AP 120, etc., described with reference to FIG. 1. For example, base station 304 may configure communications with one or more UEs (e.g., including UE 302) using FDD to provide at least one downlink frequency band (or carrier) and at least one uplink frequency band (or carrier). In addition, in some examples, base station 304 can activate and/or deactivate flexible duplexing over at least an uplink frequency band (e.g., where downlink traffic demand increases).

For example, base station 304 and UE 302 may have established one or more downlink channels over which to communicate downlink signals, which can be transmitted by base station 304 (e.g., via transceiver 359) and received by UE 302 (e.g., via transceiver 309) for communicating control and/or data messages (e.g., in signaling) from the base station 304 to the UE 302 over configured communication resources. Moreover, for example, base station 304 and UE 302 may have established one or more uplink channels over which to communicate via uplink signals, which can be transmitted by UE 302 (e.g., via transceiver 309) and received by base station 304 (e.g., via transceiver 359) for communicating control and/or data messages (e.g., in signaling) from the UE 302 to the base station 304 over configured communication resources.

In an aspect, UE 302 may include one or more processors 303 and/or a memory 305 that may be communicatively coupled, e.g., via one or more buses 307, and may operate in conjunction with or otherwise implement communicating component 310 for receiving communication resources and/or related configuration information to implement flexible duplexing and/or related modifications to uplink control data transmissions. For example, the various operations related to communicating component 310 as described herein may be implemented or otherwise executed by one or more processors 303 and, in an aspect, can be executed by a single processor, while in other aspects, different ones of the operations may be executed by a combination of two or more different processors. For example, in an aspect, the one or more processors 303 may include any one or any combination of a modem processor, or a baseband processor, or a digital signal processor, or an application specific integrated circuit (ASIC), or a transmit processor, receive processor, or a transceiver processor associated with transceiver 309. Further, for example, the memory 305 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 303. Moreover, memory 305 or computer-readable storage medium may be resident in the one or more processors 303, external to the one or more processors 303, distributed across multiple entities including the one or more processors 303, etc.

In particular, the one or more processors 303 and/or memory 305 may execute actions or operations defined by communicating component 310 or its subcomponents. For instance, the one or more processors 303 and/or memory 305 may execute actions or operations defined by a flexible duplexing configuring component 312 for configuring flexible duplexing over an uplink frequency band configured for communicating with a base station. In an aspect, for example, flexible duplexing configuring component 312 may include hardware (e.g., one or more processor modules of the one or more processors 303) and/or computer-readable code or instructions stored in memory 305 and executable by at least one of the one or more processors 303 to perform the specially configured flexible duplexing configuring operations described herein. Further, for instance, the one or more processors 303 and/or memory 305 may optionally execute actions or operations defined by an indicator receiving component 314 for receiving an indication (e.g., from the base station) to activate the flexible duplexing. In an aspect, for example, indicator receiving component 314 may include hardware (e.g., one or more processor modules of the one or more processors 303) and/or computer-readable code or instructions stored in memory 305 and executable by at least one of the one or more processors 303 to perform the specially configured indicator receiving operations described herein.

Further, for instance, the one or more processors 303 and/or memory 305 may optionally execute actions or operations defined by a configuration receiving component 316 for receiving configuration information related to transmitting uplink control data over an uplink frequency band configured for flexible duplexing. In an aspect, for example, configuration receiving component 316 may include hardware (e.g., one or more processor modules of the one or more processors 303) and/or computer-readable code or instructions stored in memory 305 and executable by at least one of the one or more processors 303 to perform the specially configured configuration receiving operations described herein. Further, for instance, the one or more processors 303 and/or memory 305 may optionally execute actions or operations defined by a control data transmitting component 318 for transmitting the control data over the uplink frequency band configured for flexible duplexing. In an aspect, for example, control data transmitting component 318 may include hardware (e.g., one or more processor modules of the one or more processors 303) and/or computer-readable code or instructions stored in memory 305 and executable by at least one of the one or more processors 303 to perform the specially configured control data transmitting operations described herein.

Similarly, in an aspect, base station 304 may include one or more processors 353 and/or a memory 355 that may be communicatively coupled, e.g., via one or more buses 357, and may operate in conjunction with or otherwise implement for configuring the UE 302 (and/or one or more additional UEs) for flexible duplexing and/or related modifications to uplink control data transmissions, as described further herein. For example, the various functions related to communicating component 330 may be implemented or otherwise executed by one or more processors 353 and, in an aspect, can be executed by a single processor, while in other aspects, different ones of the functions may be executed by a combination of two or more different processors, as described above. It is to be appreciated, in one example, that the one or more processors 353 and/or memory 355 may be configured as described in examples above with respect to the one or more processors 303 and/or memory 305 of UE 302.

In an example, the one or more processors 353 and/or memory 355 may execute actions or operations defined by communicating component 330 or its subcomponents. For instance, the one or more processors 353 and/or memory 355 may execute actions or operations defined by a flexible duplexing configuring component 332 for configuring flexible duplexing over an uplink frequency band configured for receiving communications from a UE. In an aspect, for example, flexible duplexing configuring component 332 may include hardware (e.g., one or more processor modules of the one or more processors 353) and/or computer-readable code or instructions stored in memory 355 and executable by at least one of the one or more processors 353 to perform the specially configured flexible duplexing configuring operations described herein. Further, for instance, the one or more processors 353 and/or memory 355 may optionally execute actions or operations defined by an indicator transmitting component 334 for transmitting an indication (e.g., to one or more UEs) to activate the flexible duplexing. In an aspect, for example, indicator transmitting component 334 may include hardware (e.g., one or more processor modules of the one or more processors 353) and/or computer-readable code or instructions stored in memory 355 and executable by at least one of the one or more processors 353 to perform the specially configured indicator transmitting operations described herein.

Further, for instance, the one or more processors 353 and/or memory 355 may optionally execute actions or operations defined by a configuring component 336 for configuring a UE to transmit uplink control data over an uplink frequency band configured for flexible duplexing. In an aspect, for example, configuring component 336 may include hardware (e.g., one or more processor modules of the one or more processors 353) and/or computer-readable code or instructions stored in memory 355 and executable by at least one of the one or more processors 353 to perform the specially configured configuring operations described herein. Further, for instance, the one or more processors 353 and/or memory 355 may optionally execute actions or operations defined by a legacy UE rejecting component 338 for rejecting a connection request from a legacy UE (e.g., a UE that does not support flexible duplexing). In an aspect, for example, legacy UE rejecting component 338 may include hardware (e.g., one or more processor modules of the one or more processors 353) and/or computer-readable code or instructions stored in memory 355 and executable by at least one of the one or more processors 353 to perform the specially configured legacy UE rejecting operations described herein.

It is to be appreciated that transceivers 309, 359 may be configured to transmit and receive wireless signals through one or more antennas, an RF front end, one or more transmitters, and one or more receivers. In an aspect, transceivers 309, 359 may be tuned to operate at specified frequencies such that UE 302 and/or base station 304 can communicate at a certain frequency. In an aspect, the one or more processors 303 may configure transceiver 309 and/or one or more processors 353 may configure transceiver 359 to operate at a specified frequency and power level based on a configuration, a communication protocol, etc. to communicate uplink signals and/or downlink signals over related uplink or downlink communication channels over the one or more CCs.

In an aspect, transceivers 309, 359 can operate in multiple bands (e.g., using a multiband-multimode modem, not shown) such to process digital data sent and received using transceivers 309, 359. In an aspect, transceivers 309, 359 can be multiband and be configured to support multiple frequency bands for a specific communications protocol. In an aspect, transceivers 309, 359 can be configured to support multiple operating networks and communications protocols. Thus, for example, transceivers 309, 359 may enable transmission and/or reception of signals based on a specified modem configuration.

Figure 4:
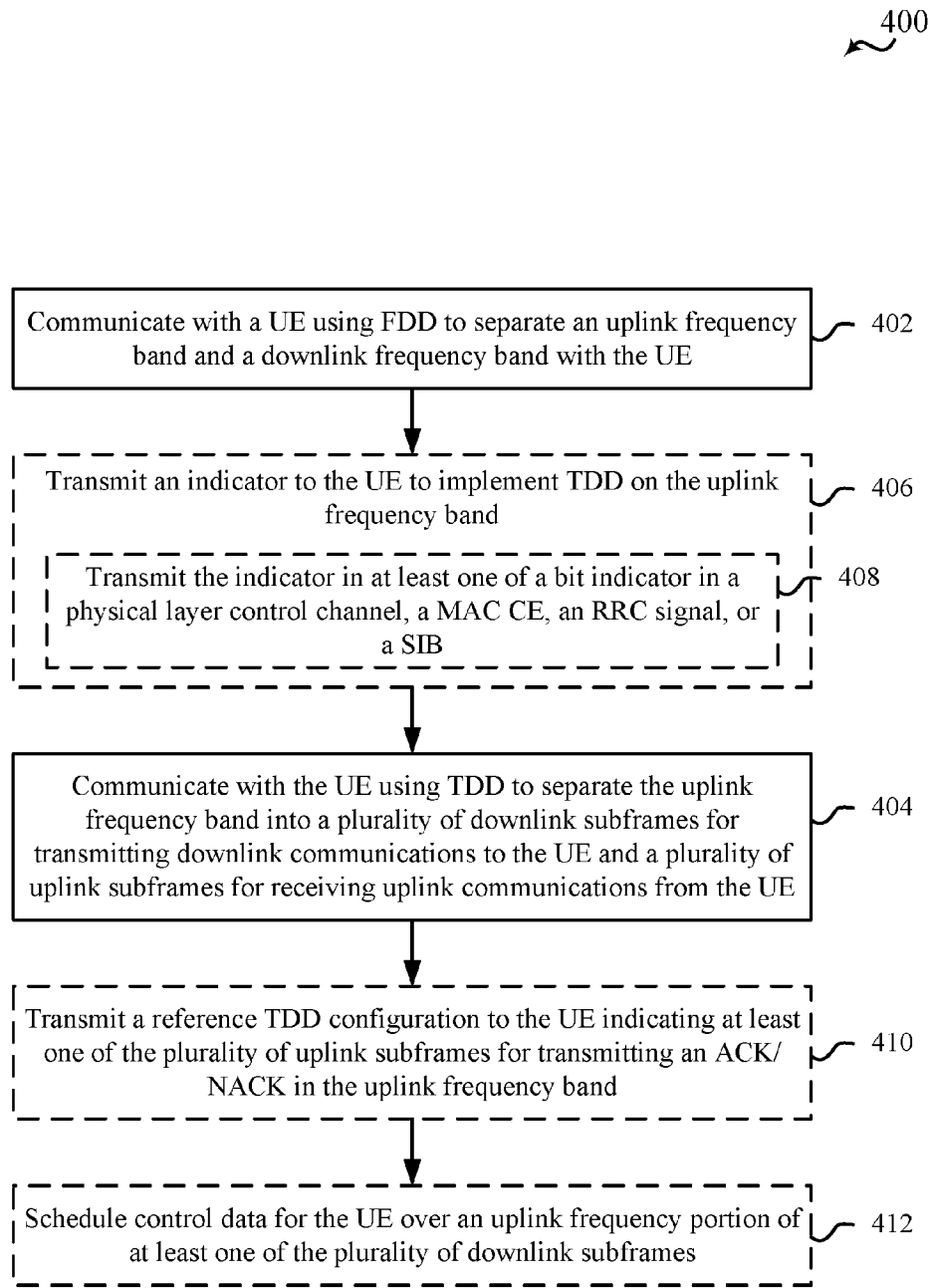
FIG. 4 illustrates a flowchart of an example method for implementing flexible duplexing in communicating with a user equipment (UE) in accordance with various aspects described herein.
Figure 5:
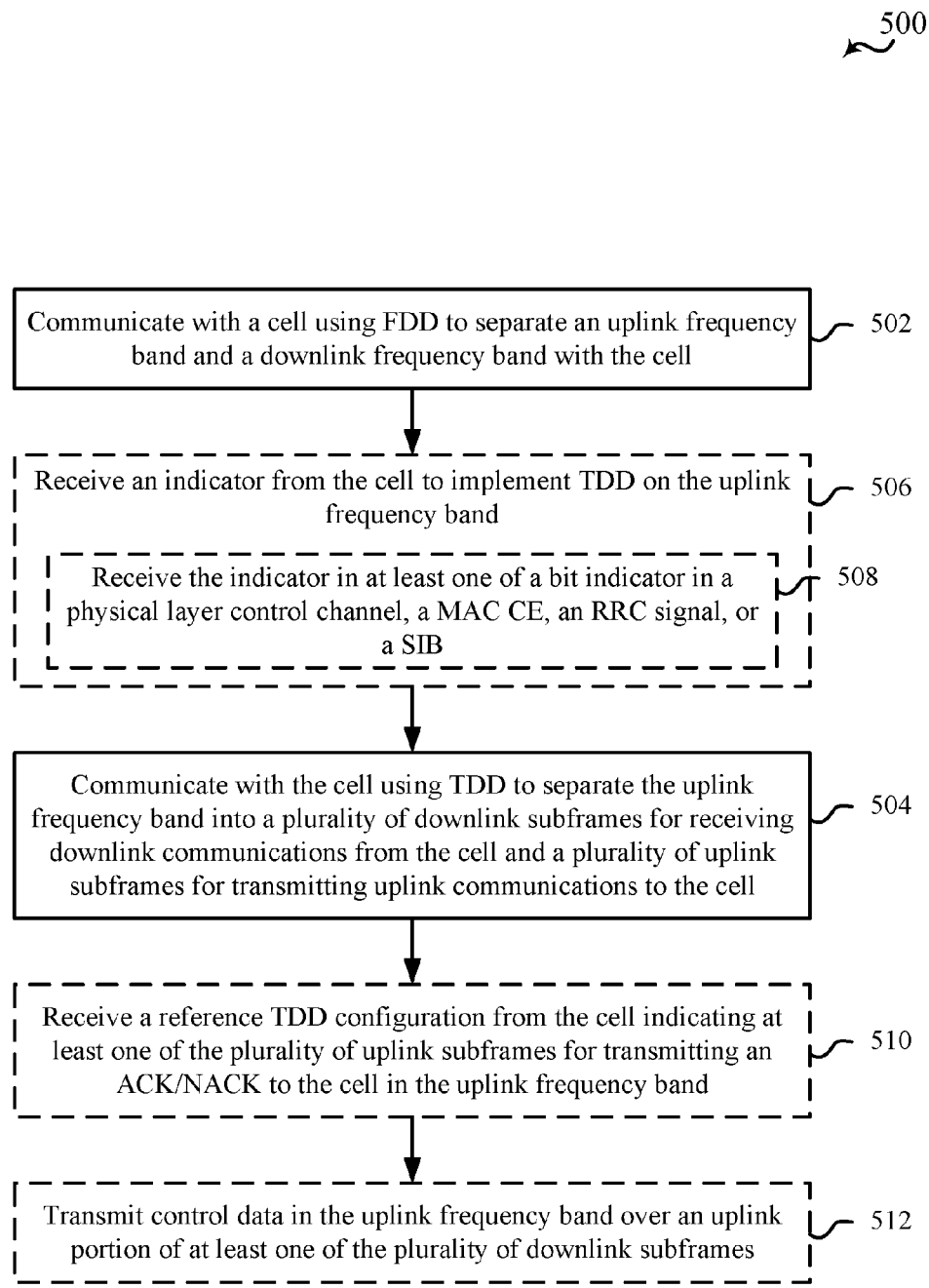
FIG. 5 illustrates a flowchart of an example method for implementing flexible duplexing in communicating with a cell in accordance with various aspects described herein.

FIG. 4 illustrates an example method 400 for communicating with a UE (e.g., by a base station) using flexible duplexing. FIG. 5 illustrates an example method 500 for communicating with a cell (e.g., by a UE) using flexible duplexing.

Method 400 can include, at Block 402, communicating with a UE using FDD to separate an uplink frequency band and a downlink frequency band with the UE. In an aspect, communicating component 330, e.g., in conjunction with processor(s) 353, memory 355, and/or transceiver 359, can communicate with the UE (e.g., UE 302) using FDD to separate the uplink frequency band and the downlink frequency band. In one example, configuring component 336, e.g., in conjunction with processor(s) 353, memory 355, and/or transceiver 359, can configure the UE 302 to communicate using the downlink and uplink frequency bands that are separated in frequency. In a specific example, configuring component 336 can configure the UE 302 to communicate using LTE-FDD.

Method 500 includes, at Block 502, communicating with a cell using FDD to separate an uplink frequency band and a downlink frequency band. In an aspect, communicating component 310, e.g., in conjunction with processor(s) 303, memory 305, and/or transceiver 309, can communicate with the cell (e.g., a cell provided by base station 304) using FDD to separate the uplink frequency band and the downlink frequency band. In one example, configuration receiving component 316 can receive a configuration from the base station 304 in the cell to transmit uplink communications over the uplink frequency band and expect to receive downlink communications over the downlink frequency band. In a specific example, configuration receiving component 316 can receive a configuration to communicate using LTE-FDD, which may include communicating according to at least the FDD DL 202 and FDD UL 204 shown in FIG. 2, for example.

Method 400 can also include, at Block 404, communicating with a UE using TDD to separate the uplink frequency band into a plurality of downlink subframes for transmitting downlink communications to the UE and a plurality of uplink subframes for receiving uplink communications from the UE. In an aspect, communicating component 330, e.g., in conjunction with processor(s) 353, memory 355, and/or transceiver 359, can communicate with the UE (e.g., UE 302) using TDD to separate the uplink frequency band into a plurality of downlink subframes for transmitting downlink communications to the UE and a plurality of uplink subframes for receiving uplink communications from the UE. For example, this can be based on flexible duplexing configuring component 332, e.g., in conjunction with processor(s) 353, memory 355, and/or transceiver 359, determining to activate flexible duplexing, which may be based on detecting one or more events. The one or more events may include events related to determining an increase in downlink bandwidth demand (e.g., an increase in downlink requests, an increase in downlink packets to be transmitted, an increase in a downlink buffer utilization, etc.). In any case, flexible duplexing configuring component 332 can configure flexible duplexing, which results in the communicating component 330 separating the uplink frequency band into uplink and downlink subframes using TDD.

Method 500 can similarly include, at Block 504, communicating with the cell using TDD to separate the uplink frequency band into a plurality of downlink subframes for receiving downlink communications from the cell and a plurality of uplink subframes for transmitting uplink communications to the cell. In an aspect, communicating component 310, e.g., in conjunction with processor(s) 303, memory 305, and/or transceiver 309, can communicate with the cell (e.g., a cell provided by base station 304) using TDD to separate the uplink frequency band into a plurality of downlink subframes for receiving downlink communications from the cell and a plurality of uplink subframes for transmitting uplink communications to the cell. For example, communicating component 310 may communicate in this regard based on flexible duplexing configuring component 312, e.g., in conjunction with processor(s) 303, memory 305, and/or transceiver 309, determining to activate flexible duplexing, which may be based on detecting one or more events and/or receiving an indication to activate flexible duplexing (e.g., in the next frame, according to a schedule or periodicity, etc.). In any case, flexible duplexing configuring component 312 can configure flexible duplexing, which results in the communicating component 310 communicating with the base station 304 based on a separation of the uplink frequency band into uplink and downlink subframes using TDD, which may be configured by the base station 304 (e.g., by indicating a certain TDD configuration in LTE).

Method 400 may optionally include, at Block 406, transmitting an indicator to the UE to implement TDD on the uplink frequency band. In an aspect, indicator transmitting component 334, e.g., in conjunction with processor(s) 353, memory 355, and/or transceiver 359, can transmit the indicator to the UE (e.g., UE 302) to implement TDD on the uplink frequency band. Flexible duplexing can also be referred to herein as implementing TDD on the uplink frequency band. For example, transmitting the indicator at Block 406 may include, at Block 408, transmitting the indicator in at least one of a bit indicator in a physical layer control channel, a media access control (MAC) control element (CE), a radio resource control (RRC) signal, or a system information block (SIB). For example, the indicator may include a bit indicator in a physical layer control channel (e.g., a physical downlink control channel (PDCCH), enhanced PDCCH (ePDCCH), etc.) between the base station 304 and UE 302. The bit indicator may specify whether to activate or deactivate flexible duplexing, for example. In another example, a larger size indicator may be used (e.g., two or more bits) to indicate additional information regarding activating/deactivating flexible duplexing (e.g., a TDD format to utilize for the uplink frequency band, a number of subframes over which to implement flexible duplexing, etc.). Further, in an example, the indicator may include a MAC CE, RRC signal, SIB, etc. that can be transmitted to the UE 302 in a configuration signal (e.g., an RRC Connection Reconfiguration message). For example, indicator transmitting component 334 can transmit the indicator in PDCCH/ePDCCH at around a 10 millisecond (ms) interval, the MAC CE signal at around a 40 ms interval, and/or the RRC signal at around an 80 ms interval. Although, in some examples, substantially any signaling may be used to communicate the indicator. In any case, based on transmitting the indicator, base station 304 can implement flexible duplexing with the UE 302 as described in Block 406. In another example, base station 304 can implement the flexible duplexing based further on a capability of the UE 302 to support flexible duplexing, which may be indicated by the UE 302 in signaling to the base station 304 during an initial configuration with the base station 304.

Method 500 can similarly optionally include, at Block 506, receiving an indicator from the cell to implement TDD on the uplink frequency band. In an aspect, indicator receiving component 314, e.g., in conjunction with processor(s) 303, memory 305, and/or transceiver 309, can receive the indicator from the cell (e.g., from a cell of base station 304) to implement the TDD on the uplink frequency band (e.g., implement flexible duplexing on the uplink frequency band). This may include, at Block 508, receiving the indicator in at least one of a bit indicator in a physical layer control channel, a MAC CE, an RRC signal, or a SIB. In an aspect, indicator receiving component 314, e.g., in conjunction with processor(s) 303, memory 305, and/or transceiver 309, can receive the indicator in the physical layer control channel (e.g., PDCCH, ePDCCH, etc.), in a MAC CE in a signal from the cell, in an RRC signal from the cell (e.g., an RRC Connection Reconfiguration message), in a SIB broadcasted from the cell, etc. In any case, based on receiving the indicator, UE 302 can implement flexible duplexing with the cell as described in Block 506.

Method 400 can also optionally include, at Block 410, transmitting a reference TDD configuration to the UE indicating at least one of the plurality of uplink subframes for transmitting an ACK/NACK in the uplink frequency band. In an aspect, configuring component 336, e.g., in conjunction with processor(s) 353, memory 355, and/or transceiver 359, can transmit the reference TDD configuration to the UE (e.g., UE 302) indicating at least one of the plurality of uplink subframes for transmitting an ACK/NACK in the uplink frequency band. For example, configuring component 336 may transmit the reference TDD configuration in an RRC or other signal, SIB, etc. to the UE 302. As described, the uplink frequency band may be time division duplexed to include subframes allocated for uplink communications and subframes allocated for downlink communications. In some examples, it is possible that a conventional ACK/NACK configuration may specify a subframe (e.g., a fixed subframe within frames configured for flexible duplexing) for the UE 302 to transmit the ACK/NACK that may be associated with a downlink subframe in the TDD configuration. Accordingly, configuring component 336 transmits the reference TDD configuration to the UE 302, which can indicate one or more uplink subframes for transmitting ACK/NACK feedback by the UE 302 and/or can indicate the TDD configuration, and the UE 302 can determine the appropriate uplink subframe in the TDD configuration for transmitting ACK/NACK feedback over the uplink frequency band (e.g., an uplink subframe that is at least 4 subframes from the associated downlink subframe on the downlink frequency band or in a downlink subframe on the uplink frequency band in flexible duplexing for which the ACK/NACK is being reported).

Method 500 may similarly optionally include, at Block 510, receiving a reference TDD configuration from the cell indicating at least one of the plurality of uplink subframes for transmitting an ACK/NACK to the cell in the uplink frequency band. In an aspect, configuration receiving component 316, e.g., in conjunction with processor(s) 303, memory 305, and/or transceiver 309, can receive the reference TDD configuration from the cell indicating at least one of the plurality of uplink subframes for transmitting ACK/NACK to the cell in the uplink frequency band. As described, in one example, the reference TDD configuration may specify the uplink subframe for transmitting ACK/NACK for one or more associated downlink subframes (e.g., on the downlink or uplink frequency band), and/or the TDD configuration information for the uplink subframes. In the latter case, for example, communicating component 310 can determine one or more uplink subframes for transmitting ACK/NACK for associated downlink subframes on the downlink frequency band and/or the uplink frequency band (e.g., the next uplink subframe on the uplink frequency band that is at least 4 subframes from the associated downlink subframes). For example, communicating component 310 can transmit ACK/NACK feedback according to the specified or determined uplink subframe, and communicating component 330 can receive and process the ACK/NACK feedback for determining whether to retransmit one or more associated downlink communications to the UE 302.

Figure 8:
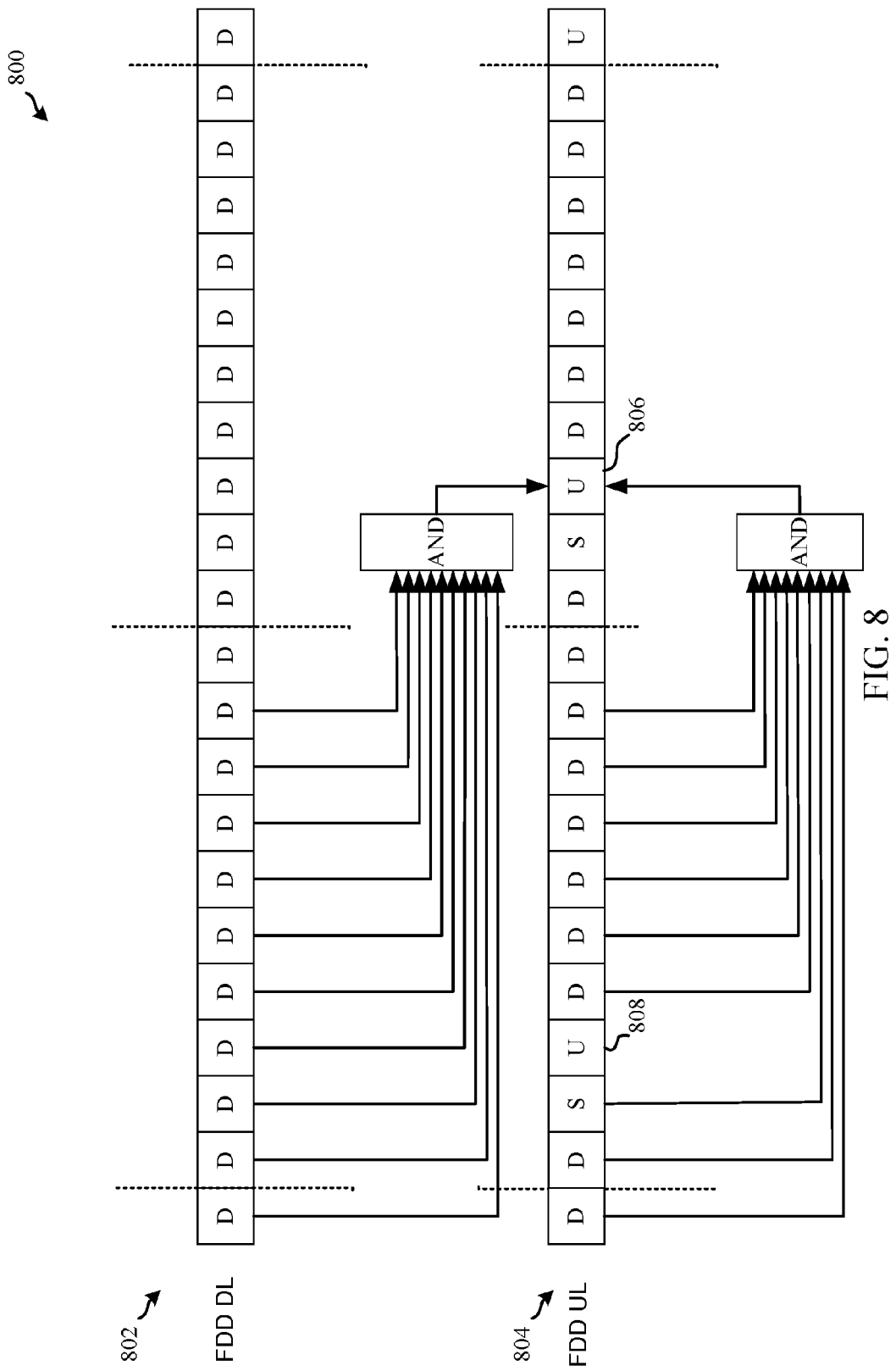
FIG. 8 illustrates an example FDD configuration for communicating acknowledgement/negative-acknowledgement feedback in accordance with various aspects described herein.

A specific example of transmitting ACK/NACK is shown in FIG. 8, which illustrates an example FDD configuration 800 in accordance with aspects described herein. FDD configuration 800 includes an FDD DL 802 and an FDD UL 804, which is further allocated into downlink and uplink subframes using TDD to allow for offloading DL traffic on the uplink frequency band. In this example, configuring component 336 can configure the UE 302 to transmit ACK/NACK in uplink subframe 806, where the ACK/NACK can correspond to combining ACK/NACK feedback for multiple prior downlink subframes on the downlink frequency band 802 (10 subframes in this example) and the uplink frequency band 804 (9 subframes in this example). For example, the downlink subframes can be those subframes that are at least 4 subframes (or another number of subframes) before the uplink subframe 806 (and that were not reported in a previous uplink subframe, such as uplink subframe 808). It is to be appreciated that this ACK/NACK scheme can be similarly applied for substantially any TDD format used on the uplink frequency band 804 when configured for flexible duplexing. Moreover, in LTE for example, physical uplink control channel (PUCCH) format 3 can be used to configure ACK/NACK feedback transmission in the first uplink subframe of the uplink frequency band 804. It is to be appreciated that this may be a different HARQ timeline than that currently used in LTE.

In any case, for example, configuring component 336 can indicate to the UE 302 that ACK/NACK for specific subframes is to occur on uplink subframe 806 in the reference TDD configuration. Configuration receiving component 316 can accordingly receive the reference TDD configuration, and determine to transmit ACK/NACK for the specific downlink subframes at uplink subframe 806. In another example, configuring component 336 can indicate the reference TDD configuration as the TDD configuration for flexible duplexing (e.g., that subframe 2 is to be an uplink subframe). Configuration receiving component 316 can receive this configuration, and communicating component 310 can determine to transmit the ACK/NACK at uplink subframe 806 based on the TDD configuration (e.g., based on determining the downlink subframes that are at least 4 subframes, or another number of subframes, before uplink subframe 806 for each uplink subframe).

In an additional or alternative example, method 400 may optionally include, at Block 412, scheduling control data for the UE over an uplink frequency portion of at least one of the plurality of downlink subframes. In an aspect, configuring component 336, e.g., in conjunction with processor(s) 353, memory 355, and/or transceiver 359, can schedule control data for the UE over the uplink frequency portion of at least one of the plurality of downlink subframes. For example, the plurality of downlink subframes over the uplink frequency band configured for flexible duplexing may be further separated into a portion (or portions) of the frequency band allocated for uplink communications, and a separate portion (or portions) of the frequency band allocated for downlink communications. For example, this can allow legacy UEs to transmit ACK/NACK feedback and/or other control data using the uplink portions of the frequency band regardless of whether the subframe is configured for uplink or downlink communications. Thus, configuring component 336 can schedule ACK/NACK feedback resources for legacy (and/or non-legacy) UEs regardless of whether flexible duplexing is activated (e.g., in resources 4 subframes from the associated downlink transmissions over the downlink frequency band or uplink frequency band in LTE).

In this regard, method 500 may also optionally include, at Block 512, transmitting control data in the uplink frequency band over an uplink portion of at least one of the plurality of downlink subframes. For example, configuration receiving component 316, e.g., in conjunction with processor(s) 303, memory 305, and/or transceiver 309, can receive scheduled resources from the base station 304 for transmitting ACK/NACK feedback, and the resources can be in the uplink portion of a subframe configured for downlink communication in the uplink frequency band. In any case, control data transmitting component 318, e.g., in conjunction with processor(s) 303, memory 305, and/or transceiver 309, can transmit the control data in the uplink frequency band over the uplink portion of at least one of the plurality of downlink subframes.

Figure 9:
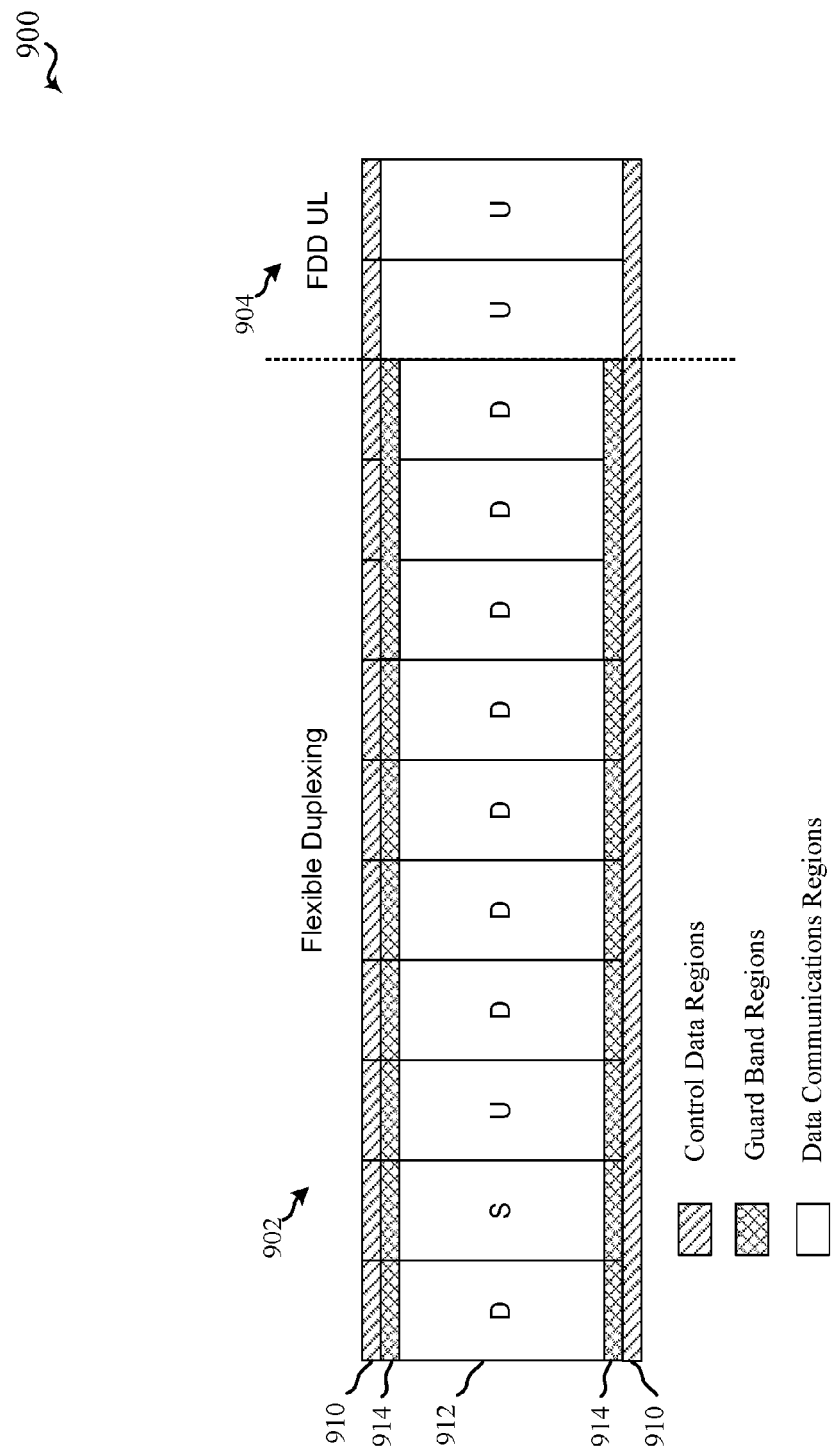
FIG. 9 illustrates an example FDD configuration for reserving an uplink control frequency portion in flexible duplexing subframes in accordance with various aspects described herein.

A specific example of transmitting ACK/NACK in this regard is shown in FIG. 9, which illustrates an example uplink frequency band 900 (where frequency is depicted vertically) that is configured for flexible duplexing in frame 902 (where time is depicted horizontally) and configured for uplink communications in frame 904. In frame 904, each subframe includes a control data region 910 (e.g., a PUCCH region in LTE) of the frequency band and a data communications region 912 (e.g., a physical uplink shared channel (PUSCH) region in LTE) of the frequency band, where the control data region 910 is utilized to communicate control data to the base station 304 over the uplink frequency band, and the data communications region 912 is utilized to communicate normal data traffic to the base station 304 over the uplink frequency band. As described, the base station 304 may schedule control data and/or data communications resources to the UE 302.

The flexible duplexing frame 902, however, can also include the control data region 910 in each subframe regardless of whether the subframe is configured for uplink or downlink communications (or is the special subframe described above). Accordingly, the control data region 910 can be used in each subframe to transmit ACK/NACK and/or other control data. This can allow for supporting legacy UEs that depend on the presence of the control data region in each subframe to possibly transmit control data related to downlink communications received in a previous subframe. Thus, configuring component 336 may schedule legacy UEs to transmit control data in the control data regions 910 of subframes configured for flexible duplexing. Configuring component 336 may avoid scheduling TDD UEs using PUCCH in the same subframe. In addition, in the flexible duplexing frame 902, a guard band region 914 can be provided in the frequency band to mitigate the impact of any possible inter-system interference (e.g., leakage from signals transmitted over the control data regions 910 to signals transmitted over the data communications regions 912, and/or vice versa). In an example, configuring component 336 can communicate one or more parameters related to the guard band (e.g., location, size, etc.) in signaling to the UE 302 (e.g., via a system information block (SIB) or radio resource control (RRC) signaling, etc.). For example, configuration receiving component 316 can receive the one or more parameters relating to the guard band, and can accordingly process signals in the data communications region 912, and/or generate signals for transmitting in the control data region 910, based at least in part on the one or more parameters relating to the guard band.

Figure 6:
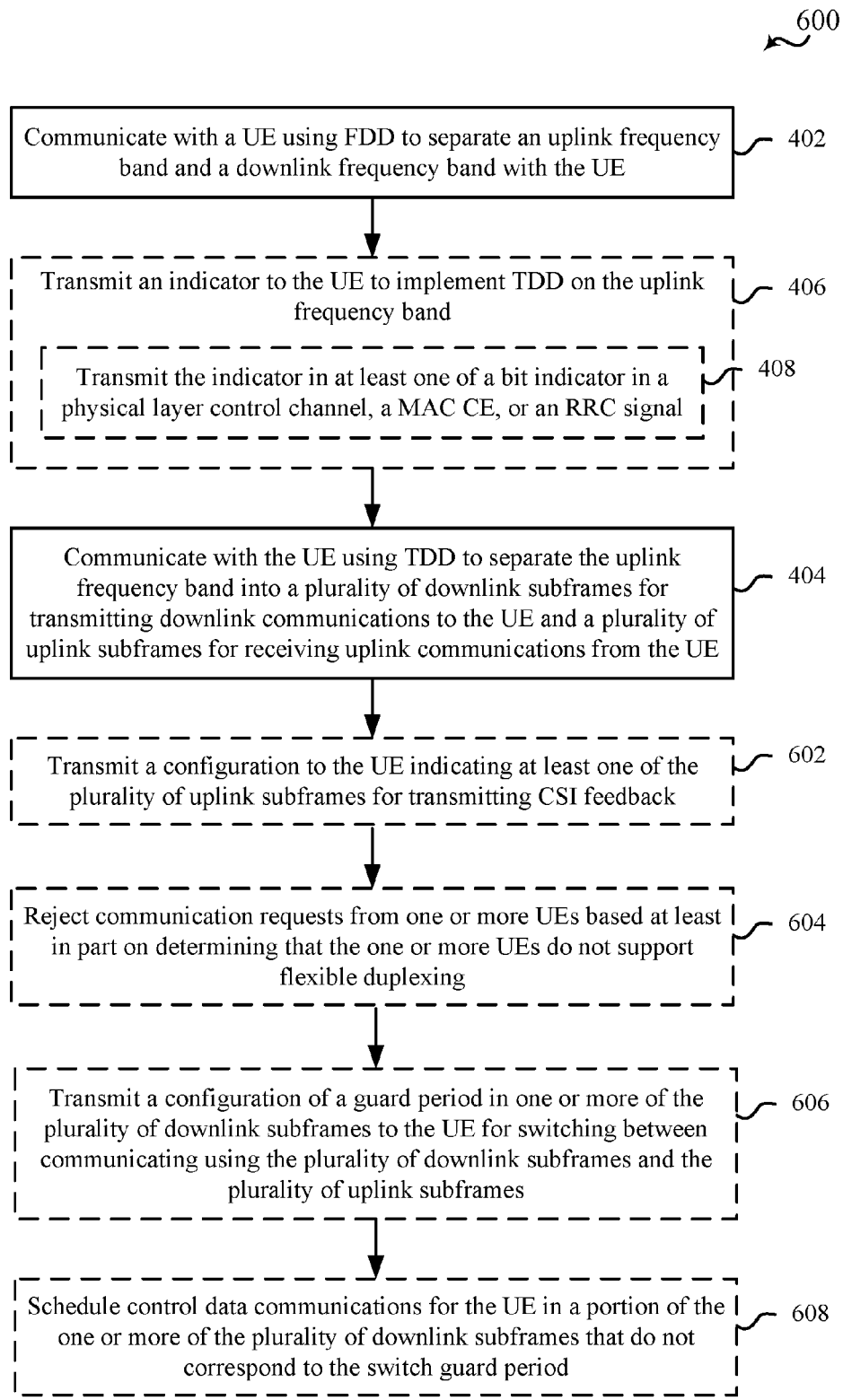
FIG. 6 illustrates a flowchart of an example method for implementing flexible duplexing in communicating with a user equipment (UE) in accordance with various aspects described herein.
Figure 7:
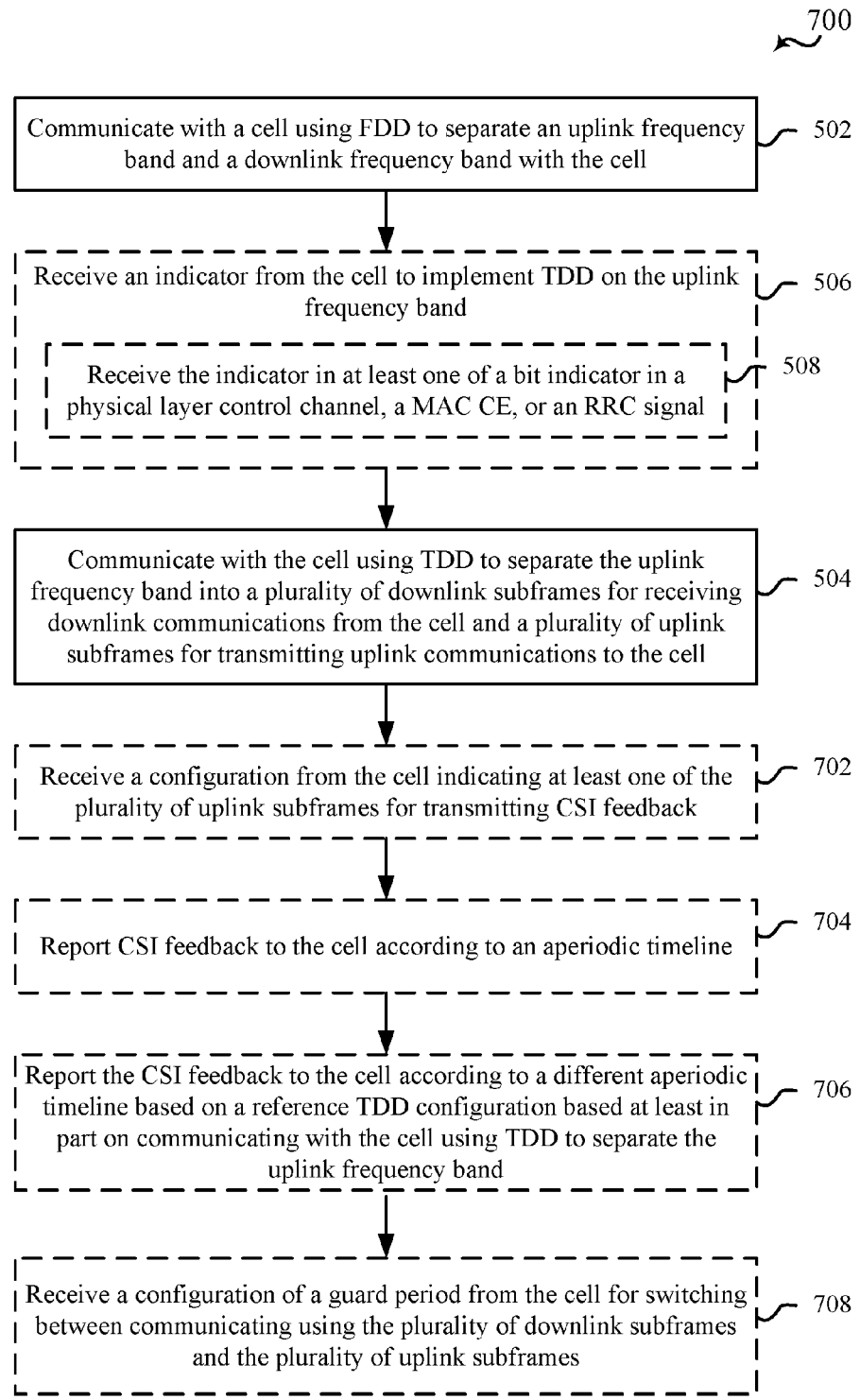
FIG. 7 illustrates a flowchart of an example method for implementing flexible duplexing in communicating with a cell in accordance with various aspects described herein.

FIG. 6 illustrates another example method 600 for communicating with a UE using flexible duplexing. FIG. 7 illustrates another example method 700 for communicating with a cell using flexible duplexing. Method 600 can include Blocks 402, 404, 406, and/or 408, as described with reference to FIG. 4 above, for implementing flexible duplexing in communicating with a UE. Method 700 can similarly include Blocks 502, 504, 506, and/or 508, as described with reference to FIG. 5 above, for implementing flexible duplexing in communicating with a cell. Method 600 can also optionally include, at Block 602, transmitting a configuration to the UE indicating at least one of the plurality of uplink subframes for transmitting CSI feedback. In an aspect, configuring component 336, e.g., in conjunction with processor(s) 353, memory 355, and/or transceiver 359, can transmit the configuration to the UE (e.g., UE 302) indicating the at least one of the plurality of uplink subframes for transmitting the CSI feedback. For example, this can include an RRC or other signal, SIB, etc. transmitted to the UE 302. The configuration can indicate a subframe in each frame or over a set of frames within which CSI can be periodically transmitted by the UE 302, and the configuration may indicate a subframe that configured for uplink communications over the uplink frequency band even if the uplink frequency band is configured for flexible duplexing.

Method 700 can similarly include, at Block 702, receiving a configuration from the cell indicating at least one of the plurality of uplink subframes for transmitting CSI feedback. In an aspect, configuration receiving component 316, e.g., in conjunction with processor(s) 303, memory 305, and/or transceiver 309, can receive the configuration (e.g., in an RRC or other signal, SIB, etc.) from the cell (e.g., a cell provided by base station 304) indicating the at least one of the plurality of uplink subframes for transmitting the CSI feedback. This configuration, for example, can relate to periodic CSI feedback, and control data transmitting component 318 can periodically transmit the CSI feedback in the at least one uplink subframe in one or more frames regardless of whether flexible duplexing is activated. In another example, control data transmitting component 318 can refrain from transmitting at least this periodic CSI feedback at least in frames over which flexible duplexing (or other TDD separation of resources) is implemented.

For reporting aperiodic CSI feedback, method 700 may optionally include, at Block 704, reporting CSI feedback to the cell according to an aperiodic timeline. In an aspect, control data transmitting component 318, e.g., in conjunction with processor(s) 303, memory 305, and/or transceiver 309, can report the CSI feedback to the cell (e.g., the cell provided by the base station 304) according to an aperiodic timeline. For example, control data transmitting component 318 can utilize different timelines depending on whether the uplink frequency band is configured for flexible duplexing in an associated frame. For example, where the frame is not configured for flexible duplexing and is thus configured for uplink communications, control data transmitting component 318 can transmit the CSI feedback based on a timeline of FDD aperiodic CSI feedback. For example, where the frame is configured for flexible duplexing, for example, control data transmitting component 318 can transmit the CSI feedback based on a timeline of the TDD downlink reference configuration, which can be received by configuration receiving component 316, as described above.

Moreover, in an example, the base station 304 can activate flexible duplexing with consideration for legacy UEs. In one example, as described above, base station 304 can adopt the frame structure described with reference to FIG. 9 above (or a similar frame structure) where downlink subframes (and special subframes) configured on the uplink frequency band have uplink frequency portions for transmitting control data. Thus, legacy UEs (e.g., in LTE-FDD) can still transmit ACK/NACK feedback according to a configured timeline, can perform radio resource monitoring (RRM), radio link monitoring (RLM), etc. measurements, and/or the like.

In another example, for handling legacy UEs, method 600 can include, at Block 604, rejecting communication requests from one or more UEs based at least in part on determining that the one or more UEs do not support flexible duplexing. In an aspect, legacy UE rejecting component 338, e.g., in conjunction with processor(s) 353, memory 355, and/or transceiver 359, can reject communication requests from one or more UEs based at least in part on determining that the one or more UEs do not support flexible duplexing. This can force the one or more UEs to associate with other base stations that do not utilize flexible duplexing. For example, legacy UE rejecting component 338 can determine whether one or more UEs support flexible duplexing based at least in part on attempting to configure a UE for flexible duplexing (e.g., via the physical control channel bit indicator, the MAC CE, RRC signal, SIB, UE capability, etc.), and if the UE does not send a valid response, legacy UE rejecting component 338 can terminate the connection with the UE 302.

In addition, in configuring flexible duplexing, a guard switch period can be provided to allow the UE 302 time to switch between a downlink subframe and an uplink subframe over the uplink frequency band. In one example, the base station 304 can configure the guard period (e.g., within a subframe or one or more adjacent subframes), and thus method 600 may optionally include, at Block 606, transmitting a configuration of a guard period in one or more of the plurality of downlink subframes to the UE for switching between communicating using the plurality of downlink subframes and the plurality of uplink subframes. In an aspect, configuring component 336, e.g., in conjunction with processor(s) 353, memory 355, and/or transceiver 359, can transmit the configuration of the guard period in the one or more of the plurality of downlink subframes to the UE for switching between communicating using the plurality of downlink subframes and the plurality of uplink subframes. For example, the configuration can indicate the downlink subframe in which the switch is to occur, a length of the guard switch period (e.g., a number of OFDM symbols, such as one or two symbols), etc. For example, configuring component 336 (or communicating component 330) can transmit the configuration using an RRC or other signal, SIB, etc. to the UE 302.

Thus, in an example, method 700 can also optionally include, at Block 708, receiving a configuration of a guard period from the cell for switching between communicating using the plurality of downlink subframes and the plurality of uplink subframes. In an aspect, configuration receiving component 316, e.g., in conjunction with processor(s) 303, memory 305, and/or transceiver 309, can receive the configuration of the guard period from the cell (e.g., a cell of base station 304) for switching between communicating using the plurality of downlink subframes and the plurality of uplink subframes. As described, the configuration can indicate a number of symbols or other time duration related to the switch guard period, an indication of a downlink subframe during which the switch is to occur, and/or the like. Communicating component 310 can accordingly switch an antenna from receiving to transmitting during the configured switch guard period without expecting to receive communications from the base station 304 during the period.

In another example, the base station 304 may implement the switch guard period without notifying the UE 302. In this example, method 600 may optionally include, at Block 608, scheduling control data communications for the UE in a portion of the one or more of the plurality of downlink subframes that does not correspond to the switch guard period. In an aspect, configuring component 336, e.g., in conjunction with processor(s) 353, memory 355, and/or transceiver 359, may schedule control data communications for the UE (e.g. UE 302) in the portion of the one or more of the plurality of subframes that does not correspond to the switch guard period. As described, in one example, the base station 304 may provide the switch guard period in one or two OFDM symbols at the end of the downlink subframe, and thus configuring component 336 may configure control data communications for the UE 302 (e.g., for channel quality indicator (CQI), ACK/NACK, sounding reference signal (SRS), etc.) in other symbols of the downlink subframe besides the one or two OFDM symbols corresponding to the switch guard period.

Figure 10:
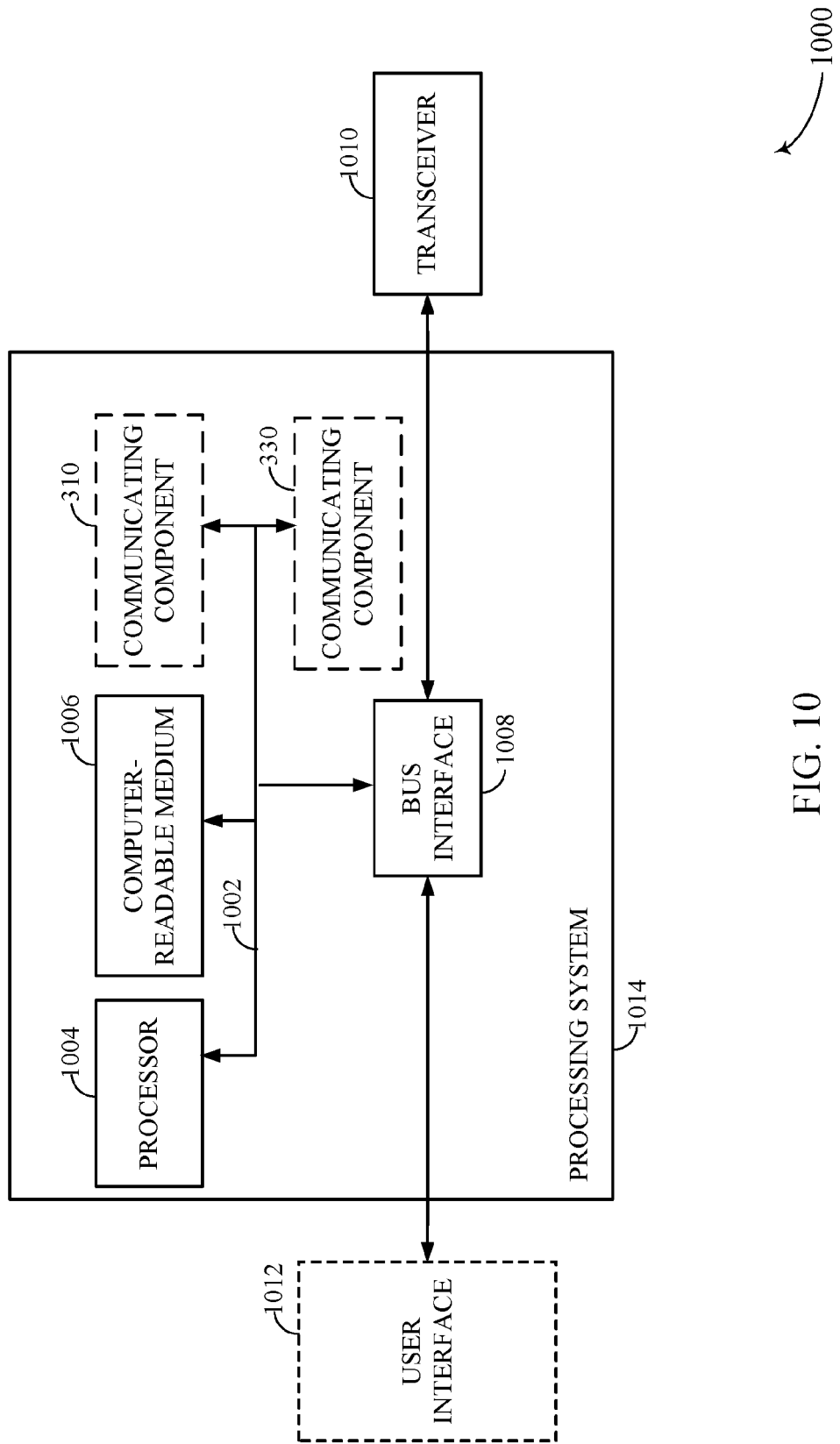
FIG. 10 is a diagram illustrating an example of a hardware implementation for an apparatus employing a processing system.

FIG. 10 is a conceptual diagram illustrating an example of a hardware implementation for an apparatus 1000 employing a processing system 1014. In some examples, the processing system 1014 may be an example of base station 105, mobile device 115, AP 120, etc. described with reference to FIG. 1, a UE 302, base station 304, etc. described with reference to FIG. 3, and/or the like. In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors, represented generally by the processor 1004, computer-readable media, represented generally by the computer-readable medium 1006, a communicating component 310, and/or a communicating component 330 (FIG. 3), which may be configured to include various components thereof (e.g., flexible duplexing configuring component 312, indicator receiving component 314, configuration receiving component 316, control data transmitting component 318, flexible duplexing configuring component 332, indicator transmitting component 334, configuring component 336, legacy UE rejecting component 338, etc.) and/or may carry out one or more methods or procedures thereof, as described herein (e.g., methods 400 (FIG. 4), 500 (FIG. 5), 600 (FIG. 6), 700 (FIG. 7), etc.). In an aspect, communicating component 310 and/or 330, and/or the components thereof, may comprise hardware, software, or a combination of hardware and software that may be configured to perform the functions, methods (e.g., methods 400 (FIG. 4), 500 (FIG. 5), 600 (FIG. 6), 700 (FIG. 7), etc.), or other methods described herein.

The bus 1002 may also link various other circuits such as timing sources, peripherals, voltage regulators and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software. In some aspects, at least a portion of the functions, methodologies, or methods associated with the communicating component 310, communicating component 330, etc. may be performed or implemented by the processor 1004 and/or the computer-readable medium 1006.

The detailed description set forth above in connection with the appended drawings describes example embodiments and does not represent all the embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for providing flexible duplexing in wireless communications, comprising:
  communicating with a cell using frequency division duplexing (FDD) to separate an uplink frequency band and a downlink frequency band with the cell;
  receiving an indicator from the cell to implement time division duplexing (TDD) on the uplink frequency band; and
  communicating with the cell using TDD to separate the uplink frequency band into a plurality of downlink subframes for receiving downlink communications from the cell and a plurality of uplink subframes for transmitting uplink communications to the cell based at least in part on receiving the indicator.

2. The method of claim 1, wherein receiving the indicator comprises receiving the indicator from the cell in at least one of a bit indicator in a physical layer control channel, in a media access channel (MAC) control element (CE) of a signal, or in a radio resource control (RRC) signal transmitted by the cell over the downlink frequency band.

3. The method of claim 1, further comprising receiving a reference TDD configuration from the cell indicating at least one of the plurality of uplink subframes for transmitting an acknowledgement (ACK)/negative-ACK (NACK) to the cell in the uplink frequency band.

4. The method of claim 3, wherein receiving the reference TDD configuration comprises receiving the reference TDD configuration in a system information block (SIB), or via radio resource control (RRC) signaling.

5. The method of claim 1, wherein separating the uplink frequency band into the plurality of downlink subframes comprises separating a first frequency portion of at least one of the plurality of downlink subframes for downlink communications and retaining a second frequency portion of the at least one of the plurality of downlink subframes for uplink communications, and further comprising transmitting control data in the uplink frequency band over the second frequency portion of the at least one of the plurality of downlink subframes.

6. The method of claim 5, wherein the second frequency portion of at least one of the plurality of downlink subframes is separated from the first frequency portion by a guard band.

7. The method of claim 6, further comprising receiving one or more parameters related to the guard band from the cell.

8. The method of claim 1, further comprising receiving a configuration from the cell indicating at least one of the plurality of uplink subframes for transmitting channel state information (CSI) feedback to the cell.

9. The method of claim 1, further comprising:
receiving a configuration from the cell indicating at least one of a plurality of subframes in the uplink frequency band for transmitting channel state information (CSI) feedback to the cell; and
refraining from transmitting the CSI feedback where the at least one of the plurality of subframes is at least one of the plurality of downlink subframes in the uplink frequency band.

10. The method of claim 1, further comprising:
reporting channel state information (CSI) feedback to the cell according to an aperiodic timeline; and
reporting the CSI feedback to the cell according to a different aperiodic timeline based on a reference TDD configuration based at least in part on receiving the indicator.

11. The method of claim 10, further comprising receiving the reference TDD configuration in a system information block (SIB), or via radio resource control (RRC) signaling.

12. The method of claim 1, further comprising receiving a configuration of a switch guard period from the cell for switching between communicating using the plurality of downlink subframes and the plurality of uplink subframes.

13. An apparatus for providing flexible duplexing in wireless communications, comprising:
at least one processor; and
a memory communicatively coupled with the at least one processor;
wherein the at least one processor is configured to:
communicate with a cell using frequency division duplexing (FDD) to separate an uplink frequency band and a downlink frequency band with the cell;
receive an indicator from the cell to implement time division duplexing (TDD) on the uplink frequency band, and
communicate with the cell using TDD to separate the uplink frequency band into a plurality of downlink subframes for receiving downlink communications from the cell and a plurality of uplink subframes for transmitting uplink communications to the cell based at least in part on receiving the indicator.

14. The apparatus of claim 13, wherein the at least one processor is configured to receive the indicator from the cell in at least one of a bit indicator in a physical layer control channel, a media access channel (MAC) control element (CE) of a signal, or in a radio resource control (RRC) signal transmitted by the cell over the downlink frequency band.

15. The apparatus of claim 13, wherein the at least one processor is further configured to receive a reference TDD configuration from the cell indicating at least one of the plurality of uplink subframes for transmitting an acknowledgement (ACK)/negative-ACK (NACK) to the cell in the uplink frequency band.

16. The apparatus of claim 13, wherein separating the uplink frequency band into the plurality of downlink subframes comprises separating a first frequency portion of at least one of the plurality of downlink subframes for downlink communications and retaining a second frequency portion of the at least one of the plurality of downlink subframes for uplink communications, and wherein the at least one processor is further configured to transmit control data in the uplink frequency band over the second frequency portion of the at least one of the plurality of downlink subframes.

17. The apparatus of claim 13, wherein the at least one processor is further configured to receive a configuration from the cell indicating at least one of the plurality of uplink subframes for transmitting channel state information (CSI) feedback to the cell.

18. The apparatus of claim 13, wherein the at least one processor is further configured to:
receive a configuration from the cell indicating at least one of a plurality of subframes in the uplink frequency band for transmitting channel state information (CSI) feedback to the cell; and
refrain from transmitting the CSI feedback where the at least one of the plurality of subframes is at least one of the plurality of downlink subframes in the uplink frequency band.

19. An apparatus for providing flexible duplexing in wireless communications, comprising:
means for communicating with a cell using frequency division duplexing (FDD) to separate an uplink frequency band and a downlink frequency band with the cell;
means for receiving an indicator from the cell to implement time division duplexing (TDD) on the uplink frequency band; and
means for communicating with the cell using TDD to separate the uplink frequency band into a plurality of downlink subframes for receiving downlink communications from the cell and a plurality of uplink subframes for transmitting uplink communications to the cell based at least in part on receiving the indicator.

20. The apparatus of claim 19, wherein the means for receiving the indicator receives the indicator from the cell in at least one of a bit indicator in a physical layer control channel, a media access channel (MAC) control element (CE) of a signal, or in a radio resource control (RRC) signal transmitted by the cell over the downlink frequency band.

* * * * *

UNITED STATES PATENT AND TRADEMARK OFFICE
CERTIFICATE OF CORRECTION

PATENT NO. : 10,367,632 B2  
APPLICATION NO. : 15/546219  
DATED : July 30, 2019  
INVENTOR(S) : Peng Cheng et al.

Page 1 of 1

It is certified that error appears in the above-identified patent and that said Letters Patent is hereby corrected as shown below:

On the Title Page

-- (71) Applicants: Peng Cheng, Beijing (CN); Yin Huang, Beijing (CN); Neng Wang, Beijing (CN); Chao Wei, Beijing (CN); QUALCOMM Incorporated, San Diego, CA (US) --
Should read:
-- (71) Applicants: QUALCOMM Incorporated, San Diego, CA (US) --

Signed and Sealed this
Fifteenth Day of October, 2019

Andrei Iancu
*Director of the United States Patent and Trademark Office*